C. CARROLL & F. B. LEE
Toilet-Cases.
No. 196,629. Patented Oct. 30, 1877.
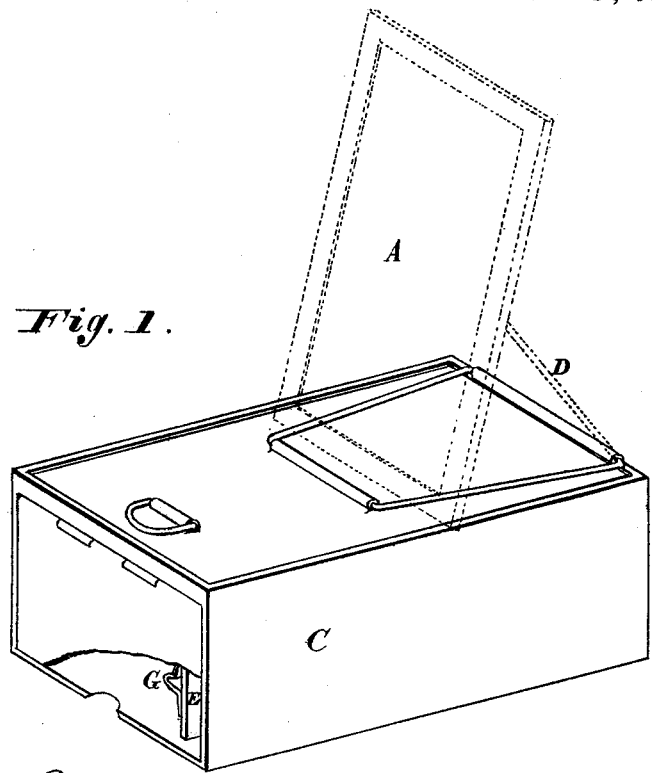
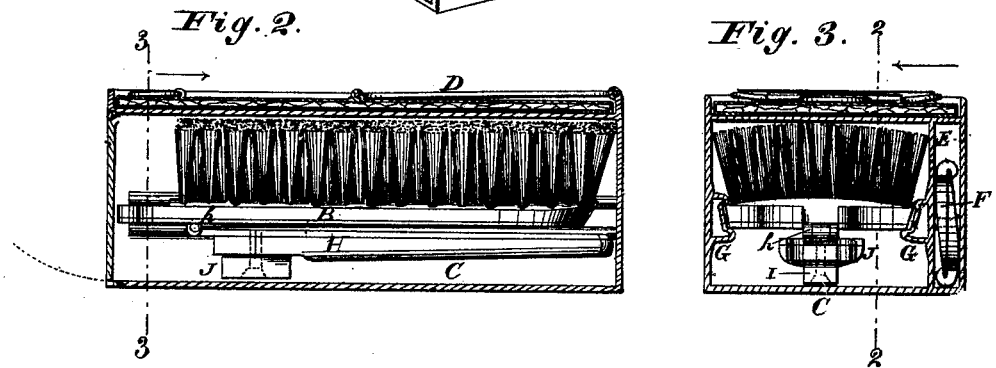
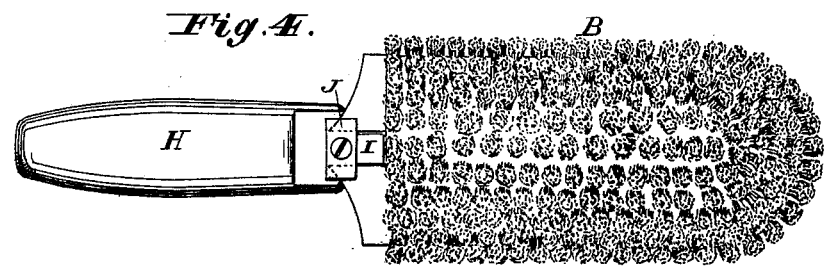
WITNESSES
Chas J. Gooch
A. H. Galt
INVENTORS
Charles Carroll
Francis B. Lee
By Knight Bros Attorneys
N. PETERS, PHOTO-LITHOGRAPHER, WASHINGTON, D C.

UNITED STATES PATENT OFFICE.

CHARLES CARROLL AND FRANCIS B. LEE, OF NEW ORLEANS, LOUISIANA; SAID LEE ASSIGNOR TO SAID CARROLL.

IMPROVEMENT IN TOILET-CASES.

Specification forming part of Letters Patent No. 196,629, dated October 30, 1877; application filed April 17, 1877.

*To all whom it may concern:*

Be it known that we, CHARLES CARROLL and FRANCIS B. LEE, of New Orleans, in the parish of Orleans and State of Louisiana, have invented a certain new and Improved Traveling Toilet-Case, of which the following is a specification:

Our invention relates, in part, to the construction of a toilet-case with grooves or guides adapted to support the brush without contact of its bristles with the case; also, to the construction of a toilet-case with compartments and covers, as hereinafter described, for the reception of a hair-brush and comb or other articles; also, to the combination, with said toilet-case, of a folding mirror, as hereinafter described.

In the accompanying drawings, Figure 1 is a perspective view of the improved toilet-case, showing the mirror in dotted lines as elevated for use, a portion of the end cover being broken away to expose the interior. Fig. 2 is a longitudinal section on the line 2 2, Fig. 3. Fig. 3 is a transverse section on the line 3 3, Fig. 2. Fig. 4 is a face view of a folding-handle brush.

B represents a brush with a folding handle, and adapted for use with my improved case, as shown in Figs. 2 and 3.

The brush may be inserted in the case C, on the interior of which are flanged grooves or guides G G, to receive the edges of the brush-back and hold it firmly in position, thus preventing the injury of the brush by the contact of its bristles with the interior of the case C. A represents a mirror, connected to the case by a hinged link, D, of suitable length, which extends from the rear corner of the case to the center of the back of the mirror A, as shown in Figs. 1 and 2, or may be of greater length than half the length of the case, adapting the mirror to be folded flat for packing and for protection, as represented in Figs. 2 and 3 and in full lines in Fig. 1. The width of the mirror may be equal to that of the case, or less, as may be preferred. E represents a separate compartment for the reception of a comb, F, which may be of the common folding form here represented, or may be straight, or of any other construction.

Having thus described our invention, the following is what we claim as new therein and desire to secure by Letters Patent:

1. The case C, constructed with flanges, grooves, or guides G, for the reception of a hair-brush, as and for the purpose set forth.

2. The combination, with a toilet-case, C, of the mirror A, hinged by means of a link, D, of suitable length, to adapt it to be folded flat on the top of the case or set up for use, as set forth.

3. The dressing-case C, constructed with separate compartments for the brush and comb, and with a folding mirror adapted to be set up for use on said case, substantially as herein set forth.

CHARLES CARROLL.
FRANCIS B. LEE.

Witnesses:
WM. B. KIMBALL,
ROBERT MOTT.